United States Patent
Konishi et al.

(10) Patent No.: US 9,418,792 B2
(45) Date of Patent: Aug. 16, 2016

(54) MULTILAYER CERAMIC CAPACITOR

(71) Applicant: TAIYO YUDEN CO., LTD., Taito-ku, Tokyo (JP)

(72) Inventors: Yukihiro Konishi, Takasaki (JP); Yuichi Kasuya, Takasaki (JP); Jun Nishikawa, Takasaki (JP); Katsuya Taniguchi, Takasaki (JP); Kotaro Mizuno, Takasaki (JP); Yusuke Kowase, Takasaki (JP); Shohei Kitamura, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 167 days.

(21) Appl. No.: 14/234,954

(22) PCT Filed: Mar. 6, 2013

(86) PCT No.: PCT/JP2013/056091
§ 371 (c)(1),
(2) Date: Jan. 24, 2014

(87) PCT Pub. No.: WO2013/133304
PCT Pub. Date: Sep. 12, 2013

(65) Prior Publication Data
US 2014/0254063 A1    Sep. 11, 2014

(30) Foreign Application Priority Data

Mar. 7, 2012 (JP) .................. 2012-050106

(51) Int. Cl.
*H01G 4/30* (2006.01)
*H01G 4/12* (2006.01)
*H01G 4/005* (2006.01)

(52) U.S. Cl.
CPC .............. *H01G 4/30* (2013.01); *H01G 4/005* (2013.01); *H01G 4/1218* (2013.01); *H01G 4/1245* (2013.01)

(58) Field of Classification Search
CPC .......... H01G 4/30; H01G 4/12; H01G 4/1218; H01G 4/1245; H01G 4/005
See application file for complete search history.

(56) References Cited

U.S. PATENT DOCUMENTS 6,205,014 B1 *   3/2001   Inomata .................. H01G 4/30
                                                  361/312
6,600,645 B1 *   7/2003   Lauf ..................... C01G 23/003
                                                  361/311

(Continued)

FOREIGN PATENT DOCUMENTS

JP    H11-317322 A       11/1999
JP    2001338828 A   *   12/2001

(Continued)

OTHER PUBLICATIONS

International Preliminary Report on Patentability (PCT/IB/373) issued Sep. 9, 2014, with Translation of Written Opinion of the International Searching Authority (PCT/ISA/237), for corresponding international application PCT/JP2013/056091.

(Continued)

*Primary Examiner* — David M Sinclair
(74) *Attorney, Agent, or Firm* — Law Offices of Katsuhiro Arai

(57) ABSTRACT

A multilayer ceramic capacitor includes ceramic grains forming a dielectric layer of the multilayer ceramic capacitor, which ceramic grains contain a coarse ceramic grain SPr having a coarse grain size Dcoa that satisfies the condition of Tmin ≤Dcoa ≤Tmax where Tmax is the maximum thickness of the dielectric layer and Tmin is the minimum thickness of the dielectric layer. The multilayer ceramic capacitor is capable of inhibiting deterioration of capacitance and capacity-temperature characteristics even when the internal electrode layer is made thin.

3 Claims, 3 Drawing Sheets

(56) References Cited

U.S. PATENT DOCUMENTS

| | | | |
|---|---|---|---|
| 6,930,876 B1* | 8/2005 | Noguchi | H01G 4/30 361/311 |
| 7,354,642 B2* | 4/2008 | Shizuno | H01L 41/083 29/25.41 |
| 7,929,272 B2* | 4/2011 | Kakei | H01G 4/1209 361/311 |
| 8,437,115 B2* | 5/2013 | Kim | H01G 4/30 361/305 |
| 2005/0088803 A1 | 4/2005 | Umeda et al. | |
| 2005/0117274 A1* | 6/2005 | Miyauchi | H01G 4/12 361/321.2 |
| 2010/0067171 A1* | 3/2010 | Yamazaki | C04B 35/4682 361/321.4 |
| 2013/0063862 A1* | 3/2013 | Kim | H01G 4/005 361/305 |

FOREIGN PATENT DOCUMENTS

| | | | |
|---|---|---|---|
| JP | 2002124433 A | * | 4/2002 |
| JP | 2005-123253 A | | 5/2005 |
| JP | 2005-129802 A | | 5/2005 |
| JP | 2007-258566 A | | 10/2007 |
| JP | 2008-078516 A | | 4/2008 |

OTHER PUBLICATIONS

International Search Report (ISR) mailed Jun. 18, 2013, issued for international application No. PCT/JP2013/056091.

A Notice of Reasons for Refusal issued by the Japanese Patent Office, mailed Aug. 7, 2014, for Japanese counterpart application No. 2013-241664.

* cited by examiner

Fig. 4

| | Dielectric layer | | | Ceramic particle | | | Characteristics | | | |
|---|---|---|---|---|---|---|---|---|---|---|
| | Tmin (μm) | Tmax (μm) | Tabe (μm) | Dcoa (μm) | Percentage (vol%) | Dabe (μm) | Dielectric constant (25℃) | Capacitance (25℃, μF) | Rate of change in capacity (25℃→85℃, %) | Short-circuiting ratio (%) |
| Sample 1 | 0.4 | 1.0 | 0.6 | 0.75 | 30 | 0.11 | 3063 | 1.82 | −14.9 | 5 |
| Sample 2 | 0.4 | 1.0 | 0.6 | 0.90 | 30 | 0.11 | 3206 | 1.91 | −15.4 | 8 |
| Sample 3 | 0.4 | 1.0 | 0.6 | 0.45 | 30 | 0.11 | 2615 | 1.56 | −17.2 | 2 |
| Sample 4 | 0.4 | 1.0 | 0.6 | 0.35 | 30 | 0.11 | 2380 | 1.42 | −18.2 | 1 |
| Sample 5 | 0.4 | 1.0 | 0.6 | 0.75 | 25 | 0.11 | 2913 | 1.73 | −15.7 | 3 |
| Sample 6 | 0.4 | 1.0 | 0.6 | 0.75 | 35 | 0.11 | 3220 | 1.82 | −14.2 | 6 |
| Sample 7 | 0.4 | 1.0 | 0.6 | 0.75 | 40 | 0.11 | 3385 | 2.01 | −13.2 | 8 |
| Sample 8 | 0.4 | 1.0 | 0.6 | 0.75 | 45 | 0.11 | 3559 | 2.12 | −13.0 | 10 |
| Sample 9 | 0.4 | 1.0 | 0.6 | 0.75 | 50 | 0.11 | 3741 | 2.23 | −12.5 | 15 |
| Sample 10 | 0.4 | 1.0 | 0.6 | 0.75 | 20 | 0.11 | 2771 | 1.65 | −16.3 | 3 |
| Sample 11 | 0.4 | 1.0 | 0.6 | 0.75 | 55 | 0.11 | 3266 | 1.94 | −12.3 | 23 |
| Sample 12 | 0.4 | 1.0 | 0.6 | 0.75 | 30 | 0.09 | 2666 | 1.59 | −15.3 | 5 |
| Sample 13 | 0.4 | 1.0 | 0.6 | 0.75 | 30 | 0.13 | 3580 | 2.13 | −14.8 | 7 |
| Sample 14 | 0.4 | 1.0 | 0.6 | 0.75 | 30 | 0.15 | 3796 | 2.26 | −14.9 | 10 |
| Sample 15 | 0.4 | 1.0 | 0.6 | 0.75 | 30 | 0.17 | 4253 | 2.53 | −14.8 | 12 |
| Sample 16 | 0.4 | 1.0 | 0.6 | 0.75 | 30 | 0.07 | 2133 | 1.27 | −15.5 | 4 |
| Sample 17 | 0.4 | 1.0 | 0.6 | 0.75 | 30 | 0.21 | 5123 | 3.05 | −14.8 | 25 |

MULTILAYER CERAMIC CAPACITOR

This application is the U.S. National Phase under 35 U.S.C. §371 of International Application PCT/JP2013/056091, filed Mar. 6, 2013, which claims priority to Japanese Patent Applications No. 2012-050106, filed Mar. 7, 2012. The International Application was published under PCT Article 21(2) in a language other than English.

TECHNICAL FIELD

The present invention relates to a multilayer ceramic capacitor having a structure of internal electrode layers laminated alternately with dielectric layers.

PRIOR ART

The demand for smaller, larger-capacity multilayer ceramic capacitors remains strong and to meet this demand, the internal electrode layer and dielectric layer must be made even thinner (refer to Patent Literature 1).

In light of the fact that the internal electrode layer of the multilayer ceramic capacitor is constituted by mutually bonded metal grains of various sizes, while the dielectric layer is constituted by mutually bonded ceramic grains of various sizes, in principle the internal electrode layer and dielectric layer can be made thinner by using finer metal grains and ceramic grains as the material grains for both.

On the other hand, ceramic grains that are classified as strong dielectrics, such as barium titanate grains, are generally used as the material grains for the dielectric layer; with such strong dielectric ceramic grains, however, a smaller grain size means a lower specific dielectric constant because of the sizing effect. In other words, using finer ceramic grains as the material grains for the dielectric layer with the purpose of making the dielectric layer thinner may cause the capacitance and capacity vs. temperature characteristics of the multilayer ceramic capacitor to drop due to a drop in the dielectric constant of the dielectric layer.

PRIOR ART LITERATURE

Patent Literature

Patent Literature 1: Japanese Patent Laid-open No. 2007-258566

SUMMARY OF THE INVENTION

Problems to Be Solved by the Invention

The object of the present invention is to provide a multilayer ceramic capacitor whose capacitance and capacity vs. temperature characteristics will not worsen even when the internal electrode layer is made thinner.

Means for Solving the Problems

To achieve the aforementioned object, the present invention provides a multilayer ceramic capacitor having a structure of internal electrode layers constituted by mutually bonded metal grains of various sizes being laminated alternately with dielectric layers constituted by mutually bonded ceramic grains of various sizes, wherein such multilayer ceramic capacitor is characterized in that the ceramic grains constituting the dielectric layer include coarse ceramic grains whose coarse grain size Dcoa meets the condition "$T_{min} \leq D_{coa} \leq T_{max}$," where Tmax represents the maximum thickness of the dielectric layer and Tmin represents the minimum thickness of the dielectric layer.

Effects of the Invention

According to the present invention, the capacitance and capacity vs. temperature characteristics will not worsen even when the internal electrode layer is made thinner, because the ceramic grains constituting the dielectric layer include coarse ceramic grains whose coarse grain size Dcoa meets the condition "Tmin representing the minimum thickness of the dielectric layer$\leq D_{coa} \leq$Tmax representing the maximum thickness of the dielectric layer."

The aforementioned and other objects, constitutions and characteristics, and operations and effects, of the present invention are made clear by the explanations below and drawings attached hereto.

BRIEF DESCRIPTION OF THE DRAWINGS

FIG. 4 is a table showing the specifications and characteristics of Samples 1 to 17.

MODE FOR CARRYING OUT THE INVENTION

{Overall Structure of Multilayer Ceramic Capacitor}

Figure 1:
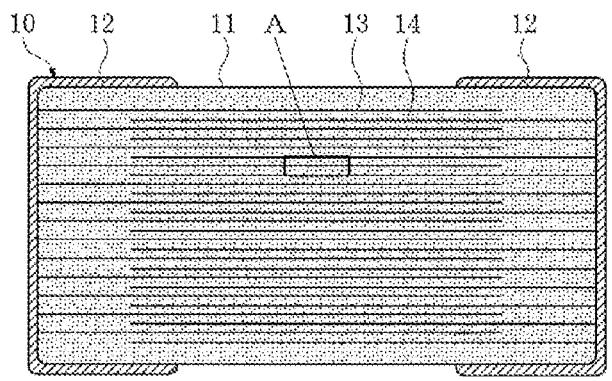
FIG. 1 is a longitudinal section view of a multilayer ceramic capacitor.

FIG. 1 is a longitudinal section view of a multilayer ceramic capacitor 10. This multilayer ceramic capacitor 10 has a capacitor body 11 of roughly rectangular solid shape whose reference dimensions of length, width, and height satisfy the relationship of "Length>Width=Height" or "Length>Width>Height," and a pair of external electrodes 12 provided on both longitudinal ends of the capacitor body 11.

The capacitor body 11 has a structure of internal electrode layers 13 laminated alternately with dielectric layers 14 in the height direction, where a margin (not indicated by any symbol) constituted by only dielectric layers 14 laminated together is present at the top part and also at the bottom part in the height direction. Each internal electrode layer 13 has a roughly rectangular shape whose length and width are smaller than the length and width of the capacitor body 11, respectively, and in FIG. 1, the left edge of an odd-numbered internal electrode layer 13 from the top is electrically connected to the left external electrode 12, while the right edge of an even-numbered internal electrode layer 13 from the top is electrically connected to the right external electrode 12. Note that, while a total of 26 internal electrode layers 13 are shown in FIG. 1 for the sake of illustrative convenience, the smaller, larger-capacity multilayer ceramic capacitor 10 can have 100 internal electrode layers 13 or more.

Each external electrode 12, while not illustrated, has a two-layer structure comprised of a base layer of nickel, copper, etc., and a surface layer of tin, palladium, gold, zinc, etc., formed on the surface of the base layer, or a three-layer structure comprised of the aforementioned base layer and surface layer with an intermediate layer of platinum, palladium, gold, copper, nickel, etc., inserted in between.

{Detailed Structure of Internal Electrode Layer and Dielectric Layer}

Figure 2:
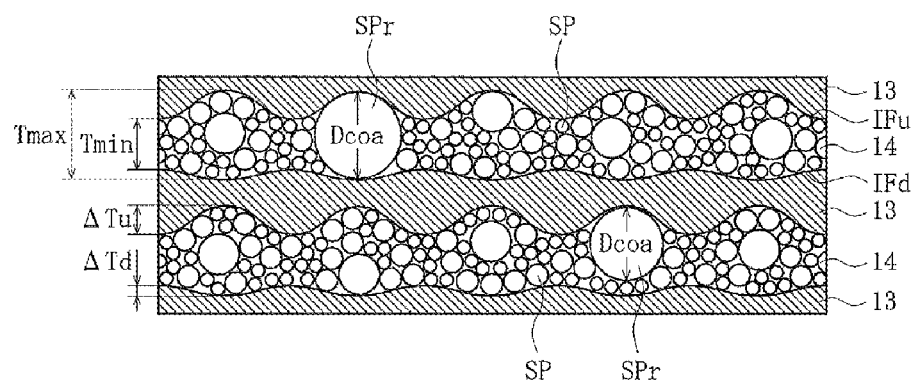
FIG. 2 is an enlarged view of part A of the multilayer ceramic capacitor shown in FIG. 1.

FIG. 2 is an enlarged view of part A of the multilayer ceramic capacitor 10 shown in FIG. 1. Note that FIG. 2 is based on an image obtained by observing a longitudinal cross-section of Sample 1 mentioned later, corresponding to FIG. 1, with a scanning electron microscope.

Each internal electrode layer 13 is constituted by mutually bonded metal grains of various sizes, while each dielectric layer 14 is constituted by mutually bonded ceramic grains SP of various sizes. The metal grains constituting each internal electrode 13 consist of grains of at least one type selected from nickel, copper, palladium and silver, while the ceramic grains SP constituting each dielectric layer 14 consist of strong dielectric grains containing at least one of barium titanate, strontium titanate, calcium titanate, magnesium titanate, calcium zirconate, calcium zirconate titanate, barium zirconate, and titanium oxide.

In addition, the top interface IFu and bottom interface IFd of each dielectric layer 14 have wave-like undulations, where "Undulation of top interface IFu (height gap $\Delta Tu$)>Undulation of bottom interface IFd (height gap $\Delta Td$)." The reason that these undulations manifest is explained in {Manufacturing Method for Multilayer Ceramic Capacitor} later on.

As shown in FIG. 2, the ceramic grains SP constituting each dielectric layer 14 include at least one coarse ceramic grain SPr whose coarse grain size Dcoa meets the condition "$Tmin \leq Dcoa \leq Tmax$," where Tmax represents the maximum thickness of the dielectric layer 14 and Tmin represents the minimum thickness of the dielectric layer 14. If the coarse grain size Dcoa of the coarse ceramic grain SPr is smaller than the minimum thickness Tmin, prevention of the worsening of capacitance and capacity vs. temperature characteristics, which is the object to be achieved, becomes difficult. On the other hand, since it is possible for the maximum thickness Tmax to be roughly the same as the coarse grain size Dcoa in a certain mode, as is the case with the coarse ceramic grain SPr shown in the top left of FIG. 2, the maximum thickness Tmax represents the upper limit of the coarse grain size Dcoa of the coarse ceramic grain SPr.

Furthermore, the percentage of the coarse ceramic grains SPr included in the ceramic grains SP constituting each dielectric layer 14 is inside a range of 25 to 50 percent by volume, or preferably inside a range of 30 to 40 percent by volume. If the percentage of the coarse ceramic grains SPr included in the ceramic grains SP constituting each dielectric layer 14 is less than 25 percent by volume, prevention of the worsening of capacitance and capacity vs. temperature characteristics, which is the object to be achieved, becomes difficult. If the percentage of the coarse ceramic grains SPr included in the ceramic grains SP constituting each dielectric layer 14 exceeds 50 percent by volume, on the other hand, keeping the occurrence of short-circuiting low becomes difficult. Additionally when the percentage of the coarse ceramic grains SPr included in the ceramic grains SP constituting each dielectric layer 14 exceeds 50 percent by volume, it becomes difficult to make each dielectric layer 14 thinner, or specifically to reduce the average thickness Tabe obtained by the formula "$(Tmax+Tmin)/2$" or "$Tmin+[(\Delta Tu+\Delta Td)/2]$."

Furthermore, the average grain size Dabe of the ceramic grains SP (including coarse ceramic grains SPr) constituting each dielectric layer 14 meets the condition "$0.15 \times Tabe \leq Dabe \leq 0.3 \times Tabe$," or preferably the condition "$0.18 \times Tabe \leq Dabe \leq 0.25 \times Tabe$," when the average thickness of each dielectric layer 14 is given by Tabe. If the average grain size Dabe of the ceramic grains SP constituting each electric layer 14 is smaller than $0.15 \times Tabe$, prevention of the worsening of capacitance and capacity vs. temperature characteristics, which is the object to be achieved, becomes difficult. If the average grain size Dabe of the ceramic grains SP constituting each electric layer 14 exceeds $0.3 \times Tabe$, on the other hand, keeping the occurrence of short-circuiting low becomes difficult.

{Manufacturing Method for Multilayer Ceramic Capacitor}

Figure 3:
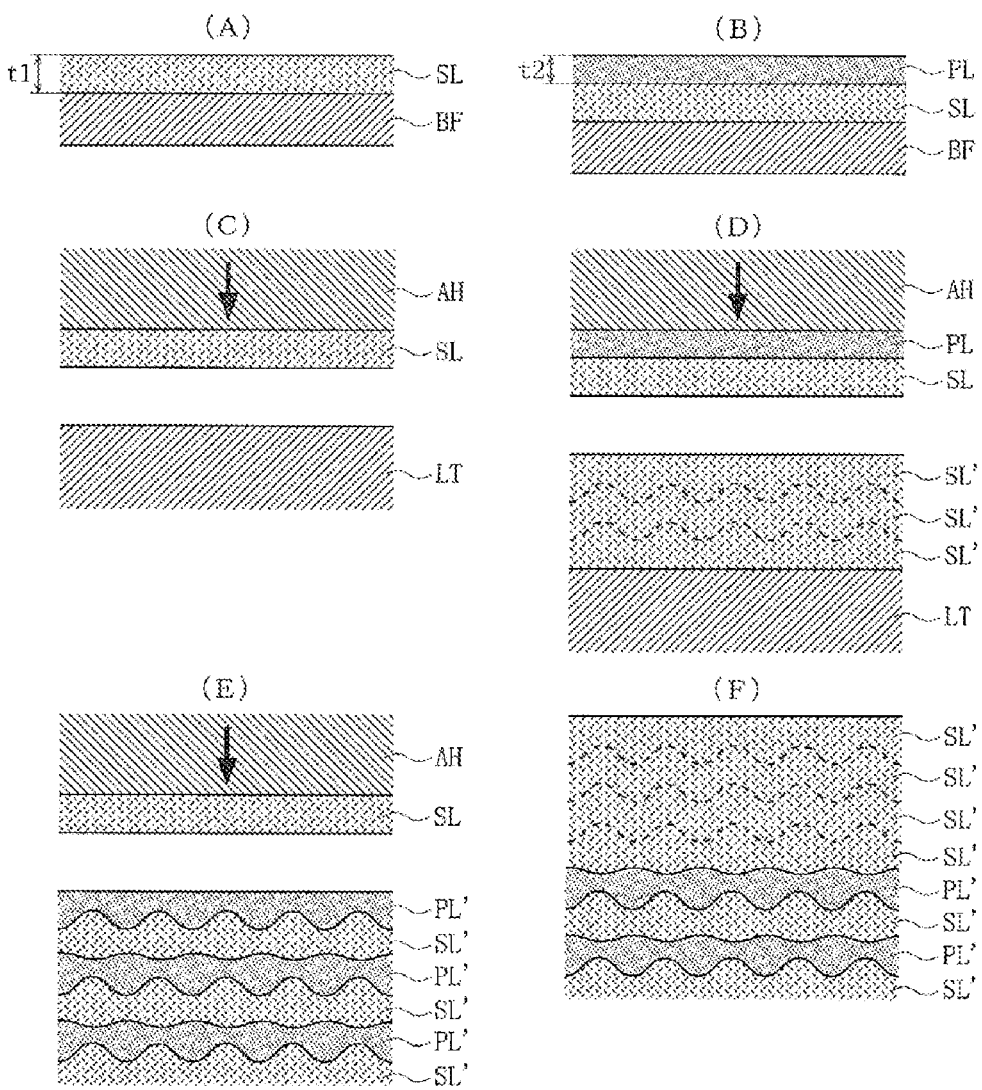
FIGS. 3 (A) to 3 (F) are drawings explaining a manufacturing method for the multilayer ceramic capacitor shown in FIG. 1.

FIGS. 3 (A) to 3 (F) are drawings explaining a manufacturing method for the multilayer ceramic capacitor 10 shown in FIG. 1. The first step of manufacturing is to prepare a ceramic slurry and electrode paste. The ceramic slurry contains at least ceramic grains, solvent and binder, plus various additives as necessary. The electrode paste contains at least metal grains, solvent, and binder, plus various additives as necessary.

The ceramic grains contained in the ceramic slurry consist of strong dielectric grains containing at least one of barium titanate, strontium titanate, calcium titanate, magnesium titanate, calcium zirconate, calcium zirconate titanate, barium zirconate and titanium oxide, and have a specified d50 (median size) and grain size distribution. On the other hand, the solvent consists of at least one of methanol, ethanol, propanol, butanol, ethyl acetate, butyl acetate, toluene, and xylene, while the binder consists of at least one of polyvinyl butyral, acrylic resin, urethane resin, and polyvinyl acetal. For the various additives, dispersant, plasticizer, and leveling agent can be used, among others, where the types of dispersant that can be used include cationic dispersant, anionic dispersant, nonionic dispersant, amphoteric surface active agent, and polymeric dispersant, while the types of plasticizer and leveling agent are not limited in any way and any known plasticizer or leveling agent can be used.

The metal grains included in the electrode paste consist of grains of at least one type selected from nickel, copper, palladium, and silver, and have a specified d50 (median size) and grain size distribution. The solvent consists of at least one of terpineol ($\alpha$, $\beta$, $\gamma$ or mixture thereof), dihydroterpineol, dihydroterpineol acetate, octanol, decanol, tridecanol, butyl carbitol, butyl carbitol acetate, toluene, and ethanol, while the binder consists of at least one of ethyl cellulose, nitrocellulose, acrylic resin, and polyvinyl butyral. For the various additives, dispersant, plasticizer, and leveling agent can be used, among others, where the types of dispersant that can be used include cationic dispersant, anionic dispersant, nonionic dispersant, amphoteric surface active agent, and polymeric dispersant, while the types of plasticizer and leveling agent are not limited in any way and any known plasticizer or leveling agent can be used.

Next, as shown in FIG. 3 (A), the ceramic slurry is applied onto the top face of a base film BF made of polyethylene terephthalate, etc., using a doctor blade, slit die, or other applicator, after which the slurry is dried to produce a first laminating sheet constituted by the base film BF with a slurry layer SL of a specified thickness t1 formed on it. Ceramic grains of various sizes are irregularly arranged in this slurry layer SL.

Also, as shown in FIG. 3 (B), the electrode paste is printed onto the top face of the slurry layer SL on the first laminating sheet using a screen printer, letterpress, or other printing machine, after which the paste is dried to produce a second laminating sheet constituted by the slurry layer SL with a paste layer PL of a specified thickness t2 and specified shape formed on it according to a specified arrangement. Metal grains of various sizes are irregularly arranged in this paste layer PL.

Next, as shown in FIG. 3 (C), the slurry layer SL on the first laminating sheet is stamped out to a specified size and the stamped-out slurry layer SL is picked up onto the flat bottom face of a pickup head AH and transferred, and the slurry layer SL is placed over the flat top face of a lamination table LT. Then, a similarly stamped-out slurry layer SL is picked up onto the flat bottom face of the pickup head AH and transferred, and the slurry layer SL is placed over the top face of the slurry layer SL already on the lamination table LT and thermally press-bonded, and this step is repeated for a specified number of times.

As shown in FIG. 3 (D), no visible interface appears between the specified number of thermally press-bonded slurry layers SL' because the layers are of the same composition, but because the ceramic grains of various sizes arranged irregularly in each slurry layer SL before thermocompression bonding are displaced during the thermocompression bonding process, the virtual mutual contact surface (refer to the broken lines) formed after thermocompression bonding undulates.

Next, as shown in FIG. 3 (D), the slurry layer SL on the second laminating sheet is stamped out to a specified size and the stamped-out slurry layer SL (including a number of paste layers PL) is picked up, on the paste layer PL side, onto the flat bottom face of the pickup head AH and transferred, and the slurry layer SL is placed over the top face of the slurry layer SL' that has been thermally press-bonded, to thermally press-bond the layers. Then, a similarly stamped-out slurry layer SL (including a number of paste layers PL) is picked up, on the paste layer PL side, onto the flat bottom face of the pickup head AH and transferred, and the slurry layer SL is placed over the top face of the paste layer PL' that has been thermally press-bonded, to thermally press-bond the layers. This process is repeated for a specified number of times.

As shown in FIG. 3 (E), a visible interface appears between the specified number of thermally press-bonded slurry layers SL' and paste layers PL' because the layers are of different compositions, and also the wave-like undulation of the top interface of the slurry layer SL' sandwiched by paste layers PL' becomes larger than the wave-like undulation of the bottom interface. This undulation appears partly because the ceramic grains of various sizes arranged irregularly in each slurry layer SL before thermocompression bonding are displaced during the thermocompression bonding process, and partly because the stamped-out slurry layer SL is thermally press-bonded in a condition where its paste layer PL side is picked up onto the flat bottom face of the pickup head AH and consequently the top interface of the slurry layer SL undulates easily during the thermocompression bonding process.

Next, as shown in FIG. 3 (E), the slurry layer SL on the first laminating sheet is stamped out to a specified size and the stamped-out slurry layer SL is picked up onto the flat bottom face of the pickup head AH and transferred, and the slurry layer SL is placed over the top face of the paste layer PL' that has been thermally press-bonded, to thermally press-bond the layers. Then, a similarly stamped-out slurry layer SL is picked up onto the flat bottom face of the pickup head AH and transferred, and the slurry layer SL is placed over the top face of the slurry layer SL' that has been thermally press-bonded, to thermally press-bond the layers. This process is repeated for a specified number of times.

As shown in FIG. 3 (F), no visible interface appears between the specified number of thermally press-bonded slurry layers SL' because the layers are of the same composition, but because the ceramic grains of various sizes arranged irregularly in each slurry layer SL before thermocompression bonding are displaced during the thermocompression bonding process, the virtual mutual contact surface (refer to the broken line) formed after thermocompression bonding undulates.

Next, a hot hydrostatic press or other press machine is used to perform final thermocompression bonding of the thermally press-bonded layers mentioned above, to produce a laminate. Next, the laminate is cut to a lattice pattern using a dicer or other cutting machine, to produce a chip corresponding to the capacitor body 11 shown in FIG. 1. Next, a multiple number of these chips are put in a sintering furnace and sintered under specified conditions (binder is removed as part of the sintering process).

Since the sintered chip corresponds to the capacitor body 11 shown in FIG. 1, it has internal electrode layers 13 and dielectric layers 14 as shown in FIG. 2. One of the two methods described below can be adopted to make sure the ceramic grains SP constituting the dielectric layer 14 of the sintered chip include coarse ceramic grains SPr of the coarse grain size Dcoa that meets the condition "$Tmin \le Dcoa \le Tmax$" (where Tmin represents the minimum thickness of the dielectric layer 14, while T max represents the maximum thickness of the dielectric layer 14).

The first method is to use the following as the ceramic grains to be contained in the ceramic slurry: (1) ceramic grains having a grain size distribution that includes coarse ceramic grains approximating the coarse ceramic grains SPr of the coarse grain size Dcoa, such as one type of ceramic grains whose grain size distribution includes the coarse grain size Dcoa at around d95; (2) a mixture of ceramic grains having a grain size distribution that does not include coarse ceramic grains SPr of the coarse grain size Dcoa on one hand, and coarse ceramic grains SPr of the coarse grain size Dcoa on the other; and (3) a mixture of ceramic grains whose d50 is small on one hand, and ceramic grains whose d50 is large and whose grain size distribution includes the coarse grain size Dcoa at around d95 on the other.

Under this method, a grain size distribution approximating the grain size distribution of the ceramic grains contained in the ceramic slurry manifests in the ceramic grains SP constituting the dielectric layer 14 of the sintered chip, and therefore it is desirable to add magnesium oxide, barium carbonate, calcium carbonate, manganese carbonate, manganese dioxide, holmium oxide, erbium oxide, ytterbium oxide, or other grain growth suppressant to the ceramic slurry beforehand so as to suppress change in grain size distribution during the sintering process as much as possible. In addition, by pre-adjusting the grain size distribution of the ceramic grains contained in the ceramic slurry, the percentage of the coarse ceramic grains SPr included in the ceramic grains SP constituting the dielectric layer 14 of the sintered chip can be kept inside a range of 25 to 50 percent by volume, and the average grain size Dabe of the ceramic grains SP constituting the dielectric layer 14 of the sintered chip also meets the condition "$0.15 \times Tabe \le Dabe \le 0.3 \times Tabe$" (where Tabe represents the average thickness of the dielectric layer 14).

The second method is to use, as the ceramic grains to be contained in the ceramic slurry, ceramic grains having a grain size distribution that does not include coarse ceramic grains SPr of the coarse grain size Dcoa, which ceramic grains is subjected to grain growth during the sintering process, thereby forming coarse ceramic grains SPr.

Under this method, a grain size distribution different from the grain size distribution of the ceramic grains contained in the ceramic slurry manifests in the ceramic grains SP constituting the dielectric layer 14 of the sintered chip, and therefore it is desirable to add one of the same grain growth suppressants mentioned above to the ceramic slurry beforehand, as necessary, by considering change in grain size distribution, so that: the coarse grain size Dcoa of the coarse ceramic grains SPr included in the ceramic grains SP constituting the dielectric layer 14 of the sintered chip meets the condition "Tmin≤Dcoa≤Tmax" (where Tmin represents the minimum thickness of the dielectric layer 14, while Tmax represents the maximum thickness of the dielectric layer 14); the percentage of the coarse ceramic grains SPr included in the ceramic grains SP constituting the dielectric layer 14 of the sintered chip can be kept inside a range of 25 to 50 percent by volume; and the average grain size Dabe of the ceramic grains SP included in the ceramic grains SP constituting the dielectric layer 14 of the sintered chip meets the condition "0.15×Tabe≤Dabe≤0.3×Tabe" (where Tabe represents the average thickness of the dielectric layer 14).

Next, a dip coater, roller coater or other coating machine is used to apply an electrode paste similar to the electrode paste mentioned above on both longitudinal ends of the sintered chip, after which the paste is baked to form a base layer for the external electrodes 12 shown in FIG. 1. Then, a surface layer is formed on the surface of the base layer using electroplating or other plating method, to produce external electrodes 12 of two-layer structure. Or, an intermediate layer and surface layer are formed, in this order, on the surface of the base layer using electroplating or other plating method, to produce external electrodes 12 of three-layer structure.

{Effects of Multilayer Ceramic Capacitor}

To verify the effects obtained by the multilayer ceramic capacitor 10 shown in FIGS. 1 and 2, 120 each of Samples 1 to 17 (multilayer ceramic capacitors) were manufactured according to the aforementioned {Manufacturing Method for Multilayer Ceramic Capacitor}.

[Sample 1]
Reference dimensions of capacitor body: Length 1.0 mm×Width 0.5 mm×Height 0.2 mm
Internal electrode layer
Average thickness: 0.7 μm
Number of layers: 100
Metal grain: Nickel
Average grain size: 0.2 μm
Dielectric layer
Minimum thickness Tmin: 0.4 μm
Maximum thickness Tmax: 1.0 μm
Average thickness Tabe: 0.6 μm
Number of layers: 100
Ceramic grain SP: Barium titanate
Coarse grain size Dcoa: 0.75 μm
Average grain size Dabe: 0.11 μm
Percentage of coarse ceramic grains: 30 percent by volume

[Sample 2]
Same as in Sample 1, except that the coarse grain size Dcoa was 0.90 μm.

[Sample 3]
Same as in Sample 1, except that the coarse grain size Dcoa was 0.45 μm.

[Sample 4]
Same as in Sample 1, except that the coarse grain size Dcoa was 0.35 μm.

[Sample 5]
Same as in Sample 1, except that the percentage of coarse ceramic grains was 25 percent by volume.

[Sample 6]
Same as in Sample 1, except that the percentage of coarse ceramic grains was 35 percent by volume.

[Sample 7]
Same as in Sample 1, except that the percentage of coarse ceramic grains was 40 percent by volume.

[Sample 8]
Same as in Sample 1, except that the percentage of coarse ceramic grains was 45 percent by volume.

[Sample 9]
Same as in Sample 1, except that the percentage of coarse ceramic grains was 50 percent by volume.

[Sample 10]
Same as in Sample 1, except that the percentage of coarse ceramic grains was 20 percent by volume.

[Sample 11]
Same as in Sample 1, except that the percentage of coarse ceramic grains was 55 percent by volume.

[Sample 12]
Same as in Sample 1, except that the average grain size Dabe was 0.09 μm.

[Sample 13]
Same as in Sample 1, except that the average grain size Dabe was 0.13 μm.

[Sample 14]
Same as in Sample 1, except that the average grain size Dabe was 0.15 μm.

[Sample 15]
Same as in Sample 1, except that the average grain size Dabe was 0.17 μm.

[Sample 16]
Same as in Sample 1, except that the average grain size Dabe was 0.07 μm.

[Sample 17]
Same as in Sample 1, except that the average grain size Dabe was 0.21 μm.

FIG. 4 shows the specifications and characteristics of Samples 1 to 17 above, and how these specifications and characteristics shown in the figure were measured are explained below.

To measure the Tmin (minimum thickness), Tmax (maximum thickness) and Tabe (average thickness) of each of Samples 1 to 17, 10 each of Samples 1 to 17 were prepared and each sample piece was observed on its longitudinal cross-section corresponding to FIG. 1 using a scanning electron microscope at a magnification of ×3000 and the Tmin (minimum thickness) and Tmax (maximum thickness) of the dielectric layer inside the observed range were measured, to obtain the Tmin (minimum thickness) and Tmax (maximum thickness) of each of Samples 1 to 17 from the average Tmin (minimum thickness) of 10 sample pieces and average Tmax (maximum thickness) of 10 sample pieces, while the average thickness obtained from these Tmin (minimum thickness) and Tmax (maximum thickness) was used as the Tabe (average thickness) of each of Samples 1 to 17.

Also to measure the Dcoa (coarse grain size), percentage, and Dabe (average grain size) of the ceramic grains in each of Samples 1 to 17, the grain sizes of all ceramic grains inside the observed range were measured, where, if the number of ceramic grains in the observed range was less than 300, then the grain sizes of all ceramic grains inside a different observed range were measured successively so that at least 300 grains were measured, after which the Dcoa (coarse grain size), volumetric percentage of the coarse grains based on cross-section area, and Dabe (average grain size) were measured, respectively, to obtain the Dcoa (coarse grain size), percentage, and Dabe (average grain size) of each of Samples 1 to 17 from the average Dcoa (coarse grain size) of 10 sample pieces, average volumetric percentage of 10 sample pieces, and average Dabe (average grain size) of 10 sample pieces, respectively.

Among the characteristics of Samples 1 to 17, dielectric constant, capacitance, and rate of change in capacity were measured by preparing 10 each of Samples 1 to 17 and then measuring them for the dielectric constant of the dielectric layer and the overall capacitance at a frequency of 1 kHz, voltage of 1 V, and ambience of 25° C., while measuring the overall capacitance on the same sample pieces again at an ambience of 85° C., to obtain for each sample piece the percentage rate of change in capacity (rate of decrease in capacity) relative to a temperature shift from 25° C. to 85° C., to obtain the dielectric constant, capacitance, and rate of change in capacity of each of Samples 1 to 17 from the average dielectric constant of 10 sample pieces, average capacitance of 10 sample pieces, and average rate of change in capacity of 10 sample pieces.

Among the characteristics of Samples 1 to 17, short-circuiting ratio was measured by preparing 100 each of Samples 1 to 17 and then applying a voltage of 1 VDC to recognize those sample pieces whose resistance value was less than 1 kΩ as short-circuited, to obtain the short-circuiting ratio of each of Samples 1 to 17 from the percentage of short-circuited sample pieces out of 100.

As shown in FIG. 4, the capacitances of Samples 1 to 3 whose coarse grain size Dcoa of the coarse ceramic grains SPr included in the ceramic grains SP constituting the dielectric layer 14 meets the condition "Tmin≤Dcoa≤Tmax" are greater than the capacitance of Sample 4 whose coarse grain size Dcoa does not meet this condition, while the rates of change in capacity (capacity vs. temperature characteristics) of Samples 1 to 3 are better (within ±18%) than the rate of change in capacity (capacity vs. temperature characteristics) of Sample 4 whose coarse grain size Dcoa does not meet this condition.

Also, as shown in FIG. 4, the capacitances of Samples 1 and 5 to 9 whose percentage of the coarse ceramic grains SPr included in the ceramic grains SP constituting the dielectric layer 14 is inside a range of 25 to 50 percent by volume are greater than the capacitance of Sample 10 whose percentage of the coarse ceramic grains SPr is outside this range, while the short-circuiting ratios of Samples 1 and 5 to 9 are lower (15% or less) than the short-circuiting ratio of Sample 11 whose percentage of the coarse ceramic grains SPr is outside the range.

In addition, among Samples 1 and 5 to 9, the rates of change in capacity (capacity vs. temperature characteristics) of Samples 1, 6 and 7 whose percentage of the coarse ceramic grains SPr is inside a range of 30 to 40 percent by volume are better (within ±15%) than the rate of change in capacity (capacity vs. temperature characteristics) of Sample 5 whose percentage of the coarse ceramic grains SPr is outside this range, while the short-circuiting ratios of Samples 1, 6 and 7 are lower (8% or less) than the short-circuiting ratios of Samples 8 and 9 whose percentage of the coarse ceramic grains SPr is outside the range.

Furthermore, as shown in FIG. 4, the capacitances of Samples 1 and 12 to 15 whose average grain size Dabe of the ceramic grains SP constituting the dielectric layer 14 meets the condition "0.15×Tabe≤Dabe≤0.3×Tabe" (or specifically 0.09 μm≤Dabe≤0.18 μm here) are greater than the capacitance of Sample 16 whose average grain size Dabe does not meet this condition, while the short-circuiting ratios of Samples 1 and 12 to 15 are lower (12% or less) than the short-circuiting ratio of Sample 17 whose average grain size Dabe does not meet this condition.

Moreover, among Samples 1 and 12 to 15, the rates of change in capacity (capacity vs. temperature characteristics) of Samples 1, 13 and 14 whose average grain size Dabe meets the condition "0.18×Tabe≤Dabe≤0.25×Tabe" (or specifically 0.108 μm≤Dabe≤0.15 μm here) are better (within ±15%) than the rate of change in capacity (capacity vs. temperature characteristics) of Sample 12 whose average grain size Dabe does not meet this condition, while the short-circuiting ratios of Samples 1, 13 and 14 are lower (10% or less) than the short-circuiting ratio of Sample 15 whose average grain size Dabe does not meet this condition.

Description of the Symbols

10—Multilayer ceramic capacitor, 11—Capacitor body, 12—External electrode, 13—Internal electrode layer, 14—Dielectric layer, SP—Ceramic grain, SPr—Coarse ceramic grain.

What is claimed is:

1. A multilayer ceramic capacitor having a structure of internal electrode layers constituted by mutually bonded metal grains of various sizes being laminated alternately with dielectric layers constituted by mutually bonded ceramic grains of various sizes, wherein the ceramic grains constituting each dielectric layer include coarse ceramic grains whose coarse grain size Dcoa meets a condition "Tmin≤Dcoa≤Tmax" where Tmax represents a maximum thickness of the dielectric layer and Tmin represents a minimum thickness of the dielectric layer and a condition "Tabe≤Dcoa" where Tabe represents an average thickness of the dielectric layer,
   wherein a percentage of the coarse ceramic grains included in the ceramic grains constituting the dielectric layer is inside a range of 25 to 50 percent by volume,
   wherein an average grain size Dabe of the ceramic grains constituting the dielectric layer meets a condition "0.15×Tabe≤Dabe≤0.3 ×Tabe".

2. A multilayer ceramic capacitor according to claim 1, wherein the dielectric layer has a top interface contacting the internal electrode layer formed on top of the dielectric layer and a bottom interface contacting the internal electrode layer formed under the dielectric layer, wherein the top and bottom interfaces undulate in a direction in which the layers extend, which interfaces have wave-shaped undulations in cross sections randomly taken in a thickness direction, wherein the undulation of the top interface is greater than the undulation of the bottom interface.

3. A multilayer ceramic capacitor according to claim 1, wherein Tmax, Tmin, Tabe, Dcoa, Dabe, and the percentage of the coarse ceramic grains by volume are values measured as follows:
   10 samples of multilayer ceramic capacitors are prepared and each sample is observed on its longitudinal cross-section using a scanning electron microscope (SEM) at a magnification of ×3000 to obtain Tmin and Tmax inside an observed range, wherein Tmin and Tmax are measured for 10 samples and averaged, and Tabe is obtained from averaged Tmin and Tmax, and
   grain sizes of all ceramic grains inside the observed range are measured to obtain Dcoa, Dabe, and volumetric percentage of coarse grains based on cross-section area wherein if the number of ceramic grains in the observed range is less than 300, grain sizes of all ceramic grains inside a different observed range are measured successively until at least 300 grains are measured, wherein Dcoa, Dabe, and volumetric percentage are measured for 10 samples and averaged.

* * * * *